United States Patent Office 3,074,941
Patented Jan. 22, 1963

3,074,941
2-CARBOCYCLIC-4-AMINOMORPHOLINE
DERIVATIVES AND INTERMEDIATES
Max J. Kalm, Skokie, Ill., assignor to G. D. Searle & Co.,
Chicago, Ill., a corporation of Delaware
No Drawing. Filed Apr. 20, 1961, Ser. No. 104,217
17 Claims. (Cl. 260—247)

This invention relates to certain cyclic hydrazine—namely, 2-carbocyclic 4-aminomorpholine derivatives—and to intermediates and processes whence these cyclic hydrazines are derived. More particularly, this invention relates to chemical compounds of the generic formula

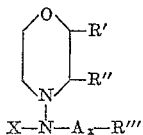

wherein R' represents an optionally-substituted carbocyclic radical, R" represents hydrogen or an alkyl or phenyl radical, X represents hydrogen or an alkyl radical, A represents an optionally-hydroxylated alkylene radical, $x$ represents 0 or 1, and R''' represents hydrogen or an alkyl or optionally-substituted carbocyclic or heterocyclic radical.

Among the carbocyclic radicals represented by R', phenyl and cycloalkyl groupings are preferred, especially cycloalkyl groupings comprising rings made up of 3 to 8 carbon atoms, inclusive. These phenyl and cycloalkyl groupings can be substituted, ad libitum, with 1 or more halogens and/or alkyl or alkoxy radicals, of which so-called "lower" alkyl and alkoxy radicals are most satisfactory for the purposes set forth. Those skilled in the art will understand that by lower alkyl and lower alkoxy radicals herein are intended groupings of the formulas $$-C_nH_{2n+1} \text{ and } -OC_nH_{2n+1}$$

wherein $n$ represents a positive integer less than 8. Illustrative of such groupings are methyl, ethyl, propyl, isopropyl, butyl, isobutyl, sec-butyl, tert-butyl, pentyl, isopentyl, tert-pentyl, neopentyl, hexyl, isohexyl, heptyl, and isomeric monovalent hydrocarbon aggregates arranged in chains, either straight or branched, together with the corresponding methoxy, ethoxy, etc. moieties. Optimally, R' represents a phenyl, cyclohexyl, or (o, m, or p) methoxyphenyl or methoxycyclohexyl radical.

The alkyl radicals represented by R", X, and R''' in the generic formula, like those comprehended by R', are most desirably of lower order also, methyl groupings being especially preferred expressions of R" and X.

The alkylene radicals represented by A in the generic formula are advantageously bivalent saturated acyclic, straight- or branched-chain hydrocarbon groupings of the formula $$-C_nH_{2n}-$$

wherein $n$ is defined as before, these alkylene radicals being subject to replacement of hydrogen therein by 1 or more hydroxyls as indicated in the first paragraph hereof. Illustrative of such alkylene and hydroxyalkylene radicals are methylene, ethylene, propylene, hydroxypropylene, trimethylene, hydroxytrimethylene, methylpropylene, tetramethylene, hydroxypentylene, dimethylpropylene, hexamethylene, etc., among which non-hydroxylated groupings containing fewer than 5 carbon atoms and groupings likewise limited as to carbon content wherein solely 1 hydroxyl is positioned on the carbon atom attached to the radical represented by R''' in the generic formula are especially preferred. These optimally-adapted alkylene and substituted-alkylene radicals can be enformulated, respectively, thus $$-C_mH_{2m}-$$

$$-C_mH_{2(m-1)}CHOH-$$

where $m$ represents a positive integer less than 5 and the point of attachment to R''' is as aforesaid. It will readily be appreciated that when $x$ in the generic formula represents 0, the radical represented by A is not present; and the generic formula becomes

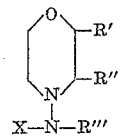

R', R", X, and R''' being defined as above. Ordinarily $x$ represents 0 unless R''' represents a cyclic radical, in which circumstance $x$ represents 0 or 1.

The carbocyclic radicals represented by R''' in the generic formula are substantially the same as those represented by R' except that (o, m, or p) phenylcycloalkyl and (1 or 2) tetrahydronaphthyl groupings are additionally comprehended and the optimal expressions thereof include cyclopentyl, cycloheptyl, cyclooctyl, phenylcyclohexyl, tetrahydronaphthyl, and dimethoxyphenyl radicals, the 2 methoxy substituents referred to being in any of the 6 possible combinations of positions about the benzene ring. The heterocyclic radicals represented by R''' comprehend furyl, pyrazinyl, and indolyl groupings, among which 2-furyl and 3-indolyl radicals are preferred. It follows that R''' most desirably represents a radical of the formula $$-C_nH_{2n+1}$$

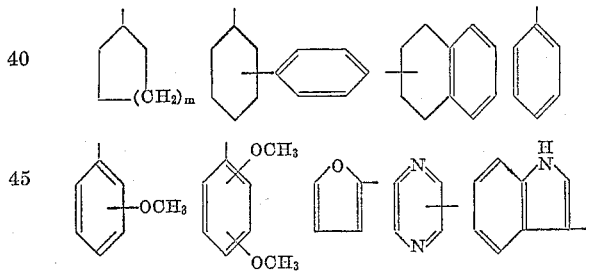

wherein $n$ and $m$ are defined as above.

Inasmuch as there is at least one asymmetric carbon atom present in each of the products herein described and claimed, it will be apparent that these products exist both as racemic mixtures and the stereochemically homogeneous isomers which compose them. Thus, for example, the highly preferred species of invention, 3-methyl-4-(1-methyl-2-phenylethylamino)morpholine hydrochloride, is obtained by the procedure of Example 22 as a racemate melting at 209–210°, whereas its component enantiomorphs disclosed in Examples 23 and 24 melt at 226.5–227.5° and are characterized by specific rotations of —24.3° and +23.6° as measured in methanol solution referred to the D line of sodium. Three other racemic forms of 3-methyl-4-(1 - methyl - 2 - phenylethylamino)-morpholine hydrochloride exist, one of them being the product of Example 22 melting at 183–189°; and each of these racemates can be resolved into optically active isomeric pairs. All of these various racemates and component enantiomorphs are within the purview of the invention set forth.

Equivalent to the foregoing compounds for purposes of the present invention are non-toxic acid addition salts thereof, the composition of which is depicted by

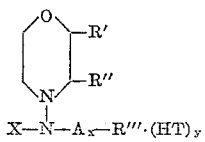

X—N—A$_x$—R'''·(HT)$_y$ wherein R', R", X, A, x, and R''' have the meanings hereinbefore assigned; T is one equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which, in combination with the cationic portion of a salt aforesaid, is neither pharmacologically nor otherwise undesirable in physiological dosage; and y is a positive integer less than 4.

The application for Letters Patent securing the invention herein described and claimed is a continuation-in-part of applicant's prior copending applications Serial Nos. 794,518 and 810,997, filed February 20, 1959, and May 5, 1959, respectively, both now abandoned.

The compounds to which this invention relates are useful because of their valuable pharmacological properties. Thus, for example, they share an unexpected and extraordinary capacity to stimulate the central nervous system—perhaps as a result of their hydrazino structure. Further, they are anti-biotic agents variously effective against bacteria such as *B. subtilis* and *E. coli*, fungi such as *Tricophyton mentagrophytes*, algae such as *Chlorella vulgaris*, and cotyledenous seed germination. They are also anti-inflammatory agents capable of counteracting the heat, swelling, redness, and granuloma-formation characteristic of the inflammatory response to tissue injury; and, finally, they inhibit the incorporation of mevalonic acid in the biosynthesis of cholesterol and otherwise operate to prevent hypercholesterolemia.

The starting materials whence the subject compounds are obtained are appropriately substituted morpholines

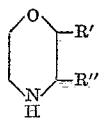

R' and R" being defined as above. Such a material is converted to the 4-nitroso compound by heating an acid solution with sodium nitrite; and the resultant intermediate is reduced to the corresponding 4-amino product hereof with ethereal lithium aluminum hydride, a solvent such as benzene or tetrohydrofuran being added if desired. The 4-amino product, in turn, is reductively aminated with a selected aldehyde or ketone and hydrogen in the presence of a catalyst such as platinum oxide, ruthenium oxide, or palladium-on-charcoal, an inert solvent such as methanol or absolute ethanol serving as the reaction medium during the reductive phase and whenever the starting aldehyde or ketone is a solid. Temperatures range from 25° to the boiling point of the liquids present for periods of time ranging from 1 to 30 hours, depending upon the reactivity of the materials involved. Manufacture can be carried out in stepwise fashion if desired, the intermediate Schiff base being isolated prior to reduction. In general, it is preferred to dispense with intermediate isolation, in which case Schiff base formation can often be improved by incorporating a small amount of glacial acetic acid in the reaction mixture. As an exception to the usual procedure, an unsaturated aldehyde or ketone such as 4-phenyl-3-buten-2-one (see Example 51 hereinafter) can be substituted for the corresponding saturated material, since reduction of the unwanted carbon-carbon double bond can be achieved simultaneously with hydrogenation of the imino constituent. A further exception to the manufacturing methods outlined is the preparation of the 4-methylamino products of the invention from corresponding 4-amino via 4-formyl compounds obtained on heating the 4-amino compounds with ethyl formate. Reduction of the 4-formyl intermediates with ethereal lithium aluminum hydride as aforesaid affords the desired 4-methylamino products.

Conversion of the amine bases of this invention to corresponding acid addition salts is accomplished by simple admixture of these compounds with 1, 2, or 3 equivalents of any of various inorganic and strong organic acids, the anionic portion of which conforms to T as hereinabove defined, the number of acid elements which can be added of course depending upon how many basic nitrogens are present in the involved molecule.

A variety of means exist for obtaining optically active forms of the products of this invention. Where a product occurs in crystals with apparently differing arrangements of the faces, manual separation of the isomers is possible. Alternatively, such of the products as are fermented by bacteria or molds will be found to undergo this fermentation at varying rates; and appropriate selections of the microorganisms involved enables preparation of 1 or either enantiomorph by destruction of the other. Yet another widely-recognized method of resolving racemic bases of the type herein disclosed consists in preparing salts thereof with optically active acids and taking advantage of the differential solubility of these salts to effect their separation, followed by freeing of the constituent stereospecific isomer with base. Finally, one can proceed from optically action starting materials to optically active final products as described in Examples 23–35, 39, and 49 therein.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade, pressures in pounds per square inch, and relative amounts of materials in parts by weight, except as otherwise noted.

*Example 1*

(A) *4-nitroso-2-phenylmorpholine.*—To a solution of 65 parts of 2-phenylmorpholine in 40 parts of concentrated hydrochloric acid diluted with 127 parts of water is added, with agitation at 75° during 1½ hours, a solution of 29 parts of sodium nitrite in 76 parts of water. The resultant mixture is maintained at 75° with agitation for 2 hours, then cooled to room temperature and extracted with ether. The ether extract is dried over anhydrous potassium carbonate and stripped of solvent by evaporation. The residue is 4-nitroso-2-phenylmorpholine.

(B) *4-amino-2-phenylmorpholine.*—A suspension of 17 parts of lithium aluminum hydride in 700 parts of ether is heated at the boiling point under reflux with agitation for 1 hour. Boiling under reflux with agitation is then maintained for 1½ hours while a solution of 66 parts of 4-nitroso-2-phenylmorpholine in 700 parts of ether is introduced. The resultant mixture is allowed to cool to room temperature and held there for 2 hours, whereupon it is again heated at the boiling point for 1½ hours, agitation being continued the while. At this point the mixture is cooled to 0–10° and consecutively diluted thereat with 18 parts of water, 14 parts of aqueous 20% sodium hydroxide, and—finally—63 parts of water. Solids precipitated in process are removed by filtration and the filtrate is stripped of solvent by evaporation. The residue is 4-amino-2-phenylmorpholine.

(C) *4-(1-methyl-2-phenylethylamino) - 2 - phenylmorpholine.*—A mixture of 27 parts of 4-amino-2-phenylmorpholine and 21 parts of 1-phenyl-2-propanone is maintained with agitation until the exothermic precipitation of solids indicates that formation of Schiff base is accomplished. There is then introduced 240 parts of methanol and 1 part of platinum oxide catalyst, whereupon agitation is resumed under hydrogen at 50 p.s.i. until hydrogen uptake indicates that reduction of the imino linkage in the Schiff base is complete. Catalyst is then removed by filtration; and solvent is evaporated from the filtrate to afford, as the residue, 4-(1-methyl-2-phenylethylamino) - 2 - phenylmorpholine. The product has the formula

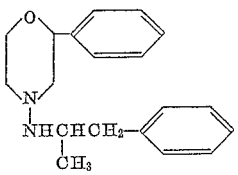

*Example 2*

(A) *3 - methyl-4-nitroso - 2 - phenylmorpholine.*—To a solution of 35 parts of 3-methyl-2-phenylmorpholine in 20 parts of concentrated hydrochloric acid diluted with 63 parts of water is added, with agitation at 75° during 50 minutes, a solution of approximately 15 parts of sodium nitrite in 38 parts of water. The resultant solution is maintained at 75° with agitation for 2 hours, then cooled to room temperature and extracted with ether. The ether extract is dried over anhydrous potassium carbonate and stripped of solvent by evaporation. The residue solidifies on cooling. Recrystallized from heptane, it melts at 66.5–68°. The pale yellow solid thus obtained is 3-methyl-4-nitroso-2-phenylmorpholine.

(B) *4-amino-3-methyl - 2 - phenylmorpholine.*—A mixture of 17 parts of lithium aluminum hydride and 525 parts of ether is heated at the boiling point under reflux with agitation for 1 hour. It is then cooled to the range, 0–10°, and maintained therein while a solution of 71 parts of 3-methyl-4-nitroso-2-phenylmorpholine in 700 parts of ether is introduced over 1½ hours. Agitation is continued throughout this operation and for 2 hours after addition is complete, at which point the resultant mixture is allowed to warm to room temperature and then heated at the boiling point under reflux for 1½ hours. The mixture is then again cooled to 0–10° and consecutively diluted at temperatures in this range with 18 parts of water, 14 parts of aqueous 20% sodium hydroxide, and—finally—63 parts of water. Solids precipitated in process are removed by filtration and the filtrate is stripped of solvent by evaporation. This yellow liquid residue is the desired 4-amino-3-methyl - 2 - phenylmorpholine.

(C) *4-amino-3-methyl-2-phenylmorpholine hydrochloride.*—A solution of 10 parts of 4-amino-3-methyl-2-phenylmorpholine in 16 parts of absolute ethanol is made barely acid with a 2-propanolic solution of hydrogen chloride, following which sufficient anhydrous ether is added to effect precipitation. The salt thrown down is recovered on a filter and recrystallized from a mixture of absolute ethanol and ether to give a white crystalline solid melting 193–194.5°. This material is 4-amino-3-methyl-2-phenylmorpholine hydrochloride, of the formula

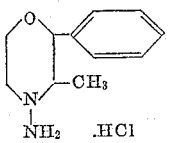

*Example 3*

(A) *2 - (o-methoxyphenyl)-3-methyl-4-nitrosomorpholine.*—Substitution of 82 parts of 2-(o-methoxyphenyl)-3-methylmorpholine for the 2-phenylmorpholine called for in Example 1A affords, by the procedure there detailed, 2-(o-methoxyphenyl)-3-methyl-4-nitrosomorpholine.

(B) *4 - amino-2-(o-methoxyphenyl)-3-methylmorpholine.*—Substitution of 81 parts of 2-(o-methoxyphenyl)-3-methyl-4-nitrosomorpholine for the 3-methyl-4-nitroso-2-phenylmorpholine called for in Example 2B affords, by the procedure there detailed, 4-amino-2-(o-methoxyphenyl)-3-methylmorpholine of the formula

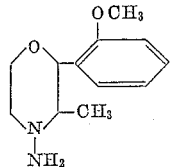

*Example 4*

(A) *2 - (p-methoxyphenyl)-3-methyl-4-nitrosomorpholine.*—Substitution of 82 parts of 2-(p-methoxyphenyl)-3-methylmorpholine for the 2-phenylmorpholine called for in Example 1A affords, by the procedure there detailed, 2-(p-methoxyphenyl)-3-methyl-4-nitrosomorpholine.

(B) *4 - amino-2-(p-methoxyphenyl)-3-methylmorpholine.*—A mixture of 17 parts of lithium aluminum hydride and 525 parts of ether is heated at the boiling point under reflux with agitation for 1 hour. It is then cooled to the range, 0–10°, and maintained therein while a solution of 81 parts of 2-(p-methoxyphenyl)-3-methyl-4-nitrosomorpholine in 700 parts of benzene is introduced over 1½ hours. Agitation is continued throughout this operation and for 2 hours after addition is complete, at which point the resultant mixture is allowed to warm to room temperature and then heated at the boiling point under reflux for 1½ hours. The mixture is then again cooled to 0–10° and consecutively diluted at temperatures in this range with 18 parts of water, 14 parts of aqueous 20% sodium hydroxide, and—finally—63 parts of water. Solids precipitated in process are removed by filtration, and the filtrate is stripped of solvent by evaporation. The residue, a light brown oil, is the desired 4-amino-2-(p-methoxyphenyl)-3-methylmorpholine.

(C) *4 - amino-2-(p-methoxyphenyl)-3-methylmorpholine hydrochloride.*—Substitution of 10 parts of 4-amino-2-(p-methoxyphenyl)-3-methylmorpholine for the 4-amino-3-methyl-2-phenylmorpholine called for in Example 2C affords, by the procedure there detailed, 4-amino-2-(p-methoxyphenyl)-3-methylmorpholine hydrochloride as an off-white crystalline solid melting at 214.5–216°. The product has the formula

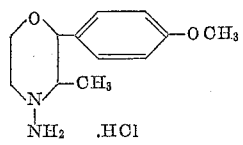

*Example 5*

(A) *4-formylamino-3-methyl-2-phenylmorpholine.*—A mixture of 50 parts of 4-amino-3-methyl-2-phenylmorpholine and 384 parts of ethyl formate is heated under reflux at the boiling point for 4 hours. Excess ethyl formate is then removed by vacuum distillation and the residue, an orange solid, recrystallized from absolute ethanol. The 4-formylamino-3-methyl-2-phenylmorpholine thus obtained is an off-white solid melting at 168–170.5°.

(B) *3-methyl-4-methylamino-2-phenylmorpholine.*—A suspension of 2 parts of lithium aluminum hydride in 140 parts of anhydrous ether is maintained with agitation at the boiling point under reflux for 1 hour. The suspension is then cooled to 0–10°, in which range a solution of 10 parts of 4-formylamino-3-methyl-2-phenylmorpholine in 180 parts of tetrahydrofuran is incorporated during approximately 1½ hours with continued agitation. Temperature is maintained in the 0–10° range for 2 hours following addition of the formyl compound, whereupon the resultant mixture is allowed to warm to room temperature and then is heated at the boiling point under reflux for 1½ hours, agitation still being continued. At this point, the mixture is again cooled to 0–10°, and 2 parts of water, 2 parts of aqueous 20% sodium hydroxide, and 7 more parts of water are mixed in, in that order. The solid precipitate thrown down is filtered off and the filtrate is stripped of solvent by evaporation. The residue is the desired 3-methyl-4-methylamino-2-phenylmorpholine.

(C) *3-methyl-4-methylamino-2-phenylmorpholine hydrochloride.*—Conversion of 3-methyl-4-methylamino-2-phenylmorpholine to the monohydrochloride salt is effected by dissolving the free base in absolute ethanol and incorporating in this solution a slight excess of hydrogen chloride dissolved in 2-propanol. Sufficient anhydrous ether is then introduced to cause precipitation, whereupon the 3-methyl-4-methylamino-2-phenylmorpholine hydrochloride thrown down is isolated by filtration. The product, recrystallized from a mixture of absolute ethanol and ether, is a white crystalline solid melting at 135–137°. It has the formula

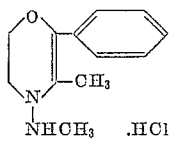

*Example 6*

(A) *4-(N-formyl-N-methylamino)-3-methyl-2-phenylmorpholine.*—A mixture of approximately 27 parts of 3-methyl-4-methylamino-2-phenylmorpholine and 191 parts of ethyl formate is heated under reflux at the boiling point for 7 hours. Excess ethyl formate is then removed by vacuum distillation, leaving as the residue a yellow oil which solidifies on standing. The 4-(N-formyl-N-methylamino)-3-methyl-2-phenylmorpholine thus obtained melts at 95–100.5°.

(B) *3-methyl-4-diethylamino-2-phenylmorpholine.*—A suspension of approximately 7 parts of lithium aluminum hydride in 360 parts of tetrahydrofuran is heated at the boiling point under reflux with agitation for 30 minutes, whereupon heating is discontinued and a solution of 27 parts of 4-(N-formyl-N-methylamino)-3-methyl-2-phenylmorpholine in 180 parts of tetrahydrofuran is added during 1½ hours with continued agitation. The resultant mixture is heated at the boiling point under reflux for 5 hours, then cooled to 0–5° and consecutively diluted with 7 parts of water, 6 parts of aqueous 20% sodium hydroxide, and 24 parts of water. The precipitated solids are removed by filtration, and the filtrate is stripped of solvent by vacuum distillation. The residue, distilled in vacuo, affords 3-methyl-4-dimethylamino-2-phenylmorpholine boiling at 100–101° under 08. mm. pressure. The product is further characterized by a refractive index at 25°, referred to the sodium D line, of 1.5230.

(C) *3-methyl-4-dimethylamino-2-phenylmorpholine hydrochloride.*—The base of the foregoing part B of this example is converted to the monohydrochloride salt by interaction with 2-propanolic hydrogen chloride according to the procedure detailed in Example 5C. The 3-methyl-4-dimethylamino-2-phenylmorpholine hydrochloride thus obtained is a white granular solid melting at approximately 190–191° (with decomposition). The product has the formula

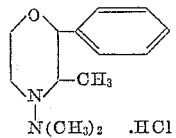

*Example 7*

(A) *4-isopropylamino-3-methyl-2-phenylmorpholine.*—To a solution of 20 parts of 4-amino-3-methyl-2-phenylmorpholine in 80 parts of absolute ethanol is added 6 parts of acetone and 1 part of platinum oxide catalyst. The resultant mixture is maintained with agitation under hydrogen at roughly 50 pounds pressure for approximately 23 hours, at which point hydrogen uptake indicates that the reductive amination is complete. Catalyst is filtered off, and the filtrate is stripped of solvent by vacuum distillation. The residue is 4-isopropylamino-3-methyl-2-phenylmorpholine.

(B) *4-isopropylamino-3-methyl-2-phenylmorpholine hydrochloride.*—The base of the foregoing part A of this example is converted to the monohydrochloride salt by interaction with 2-propanolic hydrogen chloride according to the procedure detailed in Example 5C. The 4-isopropylamino-3-methyl-2-phenylmorpholine hydrochloride thus obtained is a colorless material melting at 213–214.5°. The product has the formula

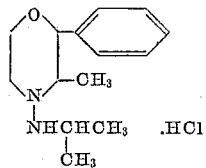

*Example 8*

(A) *4-cyclopentylamino-3-methyl-2-phenylmorpholine.*—To a mixture of approximately 10 parts of 4-amino-3-methyl-2-phenylmorpholine and approximately 5 parts of cyclopentanone is added, with agitation, 3 parts of glacial acetic acid. The oil which forms is taken up in 40 parts of absolute ethanol; and the resultant solution, mixed with ½ part of platinum oxide catalyst, is maintained with agitation under hydrogen at 1800 p.s.i. until reduction of the double bond in the Schiff base formed by interaction of the amino and ketonic starting materials is complete. Catalyst is thereupon removed by filtration and the filtrate stripped of solvent by vacuum distillation. The residue is suspended in 50 parts of water, and the suspension is made alkaline with aqueous 25% sodium hydroxide and then extracted with ether. The extract is dried over anhydrous potassium carbonate and treated with decolorizing charcoal. Evaporation of solvent affords the desired 4-cyclopentylamino-3-methyl-2-phenylmorpholine as the residue.

(B) *4-cyclopentylamino-3-methyl-2-phenylmorpholine hydrochloride.*—Conversion of the base of the foregoing part A of this example to the hydrochloric acid addition salt by the technique described in Example 5C affords 4-cyclopentylamino-3-methyl-2-phenylmorpholine hydrochloride as an off-white solid sintering and then melting at 206–207.5° (with decomposition). The product has the formula

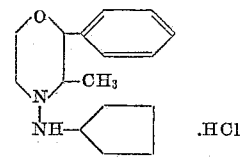

*Example 9*

(A) *4-cyclohexylamino-3-methyl-2-phenylmorpholine.*—Substitution of approximately 5 parts of cyclohexanone for the cyclopentanone called for in Example 8A affords, by the procedure there detailed, 4-cyclohexylamino-3-methyl-2-phenylmorpholine.

(B) *4-cyclohexylamino-3-methyl-2-phenylmorpholine hydrochloride.*—Conversion of the base of the foregoing part A of this example to the hydrochloric acid addition salt by the technique described in Example 5C affords 4-cyclohexylamino-3-methyl-2-phenylmorpholine hydrochloride as an off-white crystalline solid melting at approximately 238.5–239.5°. The product has the formula

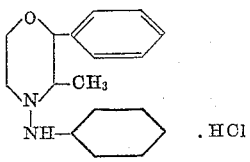

*Example 10*

(A) *4-cycloheptylamino - 3-methyl - 2-phenylmorpholine.*—Substitution of approximately 6 parts of cycloheptanone for the 5 parts of cyclopentanone called for in Example 8A affords, by the procedue there detailed, 4-cycloheptylamino-3-methyl-2-phenylmorpholine.

(B) *4-cycloheptylamino-3-methyl-2-phenylmorpholine hydrochloride.*—Conversion of the base of the foregoing part A of this example to the hydrochloric acid addition salt by the technique described in Example 5C affords 4-cycloheptylamino-3-methyl-2-phenylmorpholine hydrochloride as an off-white crystalline solid sintering and then melting at approximately 229–230° (with decomposition). The product has the formula

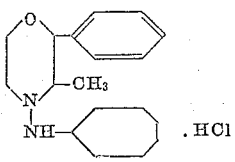

*Example 11*

(A) *4-cyclooctylamino - 3 - methyl-2-phenylmorpholine.*—Substitution of approximately 7 parts of cyclooctanone for the cyclopentanone called for in Example 8A affords, by the procedure there detailed, 4-cyclootylamino-3-methyl-2-phenylmorpholine.

(B) *4-cyclooctylamino-3-methyl-2 - phenylmorpholine hydrochloride.*—Conversion of the base of the foregoing part A of this example to the hydrochloric acid addition salt by the technique described in Example 5C affords 4-cyclooctylamino-3-methyl-2-phenylmorpholine hydrochloride as colorless crystals melting at 197–198.5°. The product has the formula

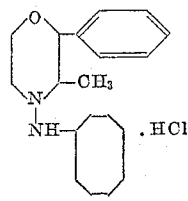

*Example 12*

*3-methyl-4-(1-methyl - 2 - cyclopentylethylamino) - 2-phenylmorpholine hydrochloride.*—A mixture of 10 parts of 4-amino-3-methyl-2-phenylmorpholine and 7 parts of 1-cyclopentyl-2-propanone is maintained with agitation until the exothermic reaction which ensues has subsided. The resultant viscous mass is thoroughly mixed with 3 parts of glacial acetic acid, and the mixture thus obtained is dissolved in 40 parts of absolute ethanol. The ethanol solution is agitated under 1800 p.s.i. of hydrogen catalyzed by 1 part of platinum oxide until hydrogen uptake indicates that saturation of the imino linkage formed by interaction of the amino and ketonic starting materials is complete, whereupon catalyst is removed by filtration and solvent by distillation at reduced pressures. The residue is suspended in 200 parts of water and the aqueous suspension made alkaline by addition of aqueous sodium hydroxide. The suspension is then extracted with ether and the ether extract dried over anhydrous potassium carbonate. Dilution of the anhydrous extract with just sufficient hydrogen chloride dissolved in 2-propanol to induce acidity causes precipitation of the desired 3-methyl-4 - (1-methyl-2-cyclopentylethylamino)-2-phenylmorpholine hydrochloride. Crystallized from a mixture of absolute ethanol and ether, the colorless product melts at 199–202°. It has the formula

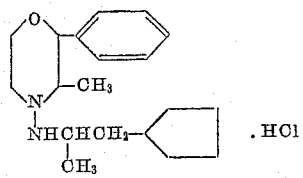

*Example 13*

*3-methyl-4 - (1-methyl - 2-cyclohexylethylamino) - 2-phenylmorpholine hydrochloride.*—Substitution of 8 parts of 1-cyclohexyl-2-propanone for the 1-cyclopentyl-2-propanone called for in Example 12 affords, by the procedure there detailed, 3-methyl-4-(1-methyl-2-cyclohexylethylamino)-2-phenylmorpholine hydrochloride as a light tan powder melting at 208–210°. The product has the formula

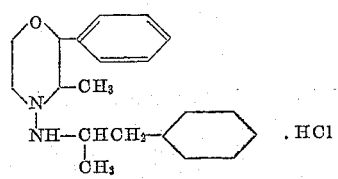

*Example 14*

(A) *3 - methyl-2-phenyl-4-(o-phenylcyclohexylamino)-morpholine.*—Substitution of approximately 11 parts of o-phenylcyclohexanone for the cyclopentanone called for in Example 8A affords, by the procedure there detailed, 3 - methyl-2-phenyl-4-(o-phenylcyclohexylamino)morpholine.

(B) *3 - methyl-2-phenyl-4-(o-phenylcyclohexylamino)-morpholine hydrochloride.*—Conversion of the base of the foregoing part A of this example to the monohydrochloride salt in accordance with the technique detailed in Example 5C affords 3-methyl-2-phenyl-4-(o-phenylcyclohexylamino)-morpholine hydrochloride as an off-white powder melting at 159–161°. The product has the formula

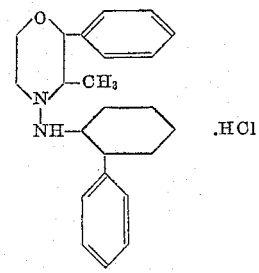

*Example 15*

*3 - methyl-2-phenyl-4-(m-phenylcyclohexylamino)-morpholine.*—Substitution of 11 parts of m-phenylclcylohexanone for the cyclopentanone called for in Example 8A affords, by the procedure there detailed, 3-methyl-2-phenyl-4-(m-phenylcyclohexylamino)morpholine, of the formula

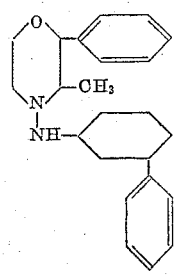

11

Example 16

(A) *4-(1,2,3,4-tetrahydro-1-naphthylamino)-3-methyl-2-phenylmorpholine.*—Substitution of 8 parts of α-tetralone for the cyclopentanone called for in Example 8A affords, by the procedure there detailed, 4-(1,2,3,4-tetrahydro-1-naphthylamino)-3-methyl-2-phenylmorpholine.

(B) *4-(1,2,3,4-tetrahydro-1-naphthylamino)-3-methyl-2-phenylmorpholine hydrochloride.*—Conversion of the base of the foregoing part A of this example to the monohydrochloride salt in accordance with the technique detailed in Example 5C affords 4-(1,2,3,4-tetrahydro-1-naphthylamino) - 3 - methyl-2-phenylmorpholine hydrochloride as colorless crystals melting at 149–152° (with effervescence). The product has the formula

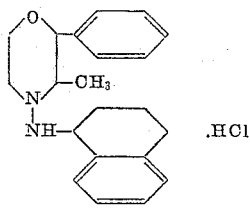

Example 17

*4 - (1,2,3,4 - tetrahydro-2-naphthylamino)-3-methyl-2-phenylmorpholine.*—Substitution of 8 parts of β-tetralone for the cyclopentanone called for in Example 8A affords, by the procedure there detailed, 4-(1,2,3,4-tetrahydro-2-naphthylamino)-3-methyl-2-phenylmorpholine, of the formula

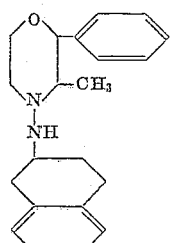

Example 18

(A) *4 - benzylidenimino - 3 - methyl-2-phenylmorpholine.*—To a solution of 30 parts of 4-amino-3-methyl-2-phenylmorpholine in 160 parts of absolute ethanol is added 17 parts of benzaldehyde. The resultant mixture is heated at near-boiling temperatures under reflux with agitation for 1 hour, then distilled substantially to dryness in vacuo. The residue is partitioned between water and ether, and the ethereal phase is separated and dried over anhydrous potassium carbonate. Distillation of the ether leaves a yellow oil, which solidifies on standing at room temperatures. This material is 4-benzylidenimino-3-methyl-2-phenylmorpholine which, recrystallized from methanol, is obtained as a nearly colorless solid melting at 91.5–94.0°. The product has the formula

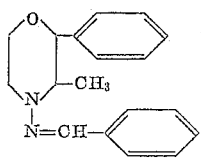

(B) *4-benzylamino-3-methyl-2-phenylmorpholine.*—A solution of 14 parts of 4-benzylidenimino-3-methyl-2-phenylmorpholine in 250 parts of absolute ethanol and 6 parts of glacial acetic acid is maintained with agitation under hydrogen at 1800 p.s.i. in the presence of 1 part of platinum oxide catalyst until the uptake of hydrogen indicates that reduction of the imino linkage is complete, whereupon catalyst is removed by filtration and the filtrate stripped of solvent by distillation. The residue is suspended in 70 parts of water. The suspension is made alkaline with aqueous sodium hydroxide and then extracted with ether. The ether extract, dried over anhydrous potassium carbonate and thereupon stripped of solvent by distillation affords 4-benzylamino-3-methyl-2-phenylmorpholine as a yellow oil.

(C) *4-benzylamino-3-methyl-2-phenylmorpholine hydrochloride.*—A solution of 7 parts of 4-benzylamino-3-methyl-2-phenylmorpholine in 20 parts of absolute ethanol is made barely acid with 2-propanolic hydrogen chloride, following which sufficient anhydrous ether is added to effect precipitation. The salt thrown down is recovered on a filter and recrystallized from a mixture of absolute ethanol and ether to give a colorless solid melting at 156–159°. This material is 4-benzylamino-3-methyl-2-phenylmorpholine hydrochloride, of the formula

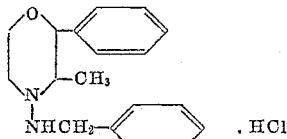

Example 19

(A) *3-methyl-4-(α-methylbenzylamino)-2-phenylmorpholine.*—To a mixture of 10 parts of 4-amino-3-methyl-2-phenylmorpholine and approximately 7 parts of acetophenone is added, with agitation, 3 parts of glacial acetic acid. The resultant mixture is taken up in 26 parts of absolute ethanol. The ethanol solution is agitated under 1800 p.s.i. of hydrogen catalyzed by 1 part of platinum oxide until hydrogen uptake indicates that saturation of the imino linkage is complete, whereupon catalyst is removed by filtration and solvent by distillation at reduced pressures. The residue is suspended in 200 parts of water and the aqueous suspension made alkaline by addition of aqueous sodium hydroxide. The suspension is then extracted with ether and the ether extract dried over anhydrous potassium carbonate and thereupon freed of solvent by distillation. The residue is 3-methyl-4-(α-methylbenzylamino)-2-phenylmorpholine.

(B) *3-methyl-4-(α-methylbenzylamino)-2-phenylmorpholine hydrobromide.*—An ether solution of 3-methyl-4-(α-methylbenzylamino)-2-phenylmorpholine is made barely acid with an absolute ethanol solution of hydrogen bromide. The precipitate thrown down is filtered off and recrystallized from a mixture of absolute ethanol and ether. The product thus isolated is 3-methyl-4-(α-methylbenzylamino) - 2 - phenylmorpholine hydrobromide, obtained as colorless needles melting at approximately 206–206.5°. The product has the formula

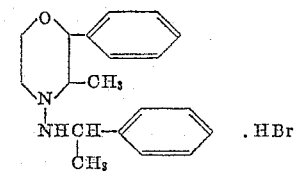

Example 20

*4 - (α-ethylbenzylamino)-3-methyl-2-phenylmorpholine hydrochloride.*—To a mixture of 10 parts of 4-amino-3-methyl-2-phenylmorpholine and approximately 8 parts of propiophenone is added, with agitation, 3 parts of glacial acetic acid. The resultant mixture is dissolved in 160 parts of absolute ethanol and the ethanol solution agitated under 1800 p.s.i. of hydrogen catalyzed by 1 part of platinum oxide until hydrogen uptake indicates that saturation of the imino linkage is complete. Catalyst is then removed by filtration and solvent by distillation at reduced pressures. The residue is suspended in 200 parts of water and the aqueous suspension made alkaline by addition of aqueous sodium hydroxide. The suspension is thereupon extracted with ether and the ether extract dried over anhydrous potassium carbonate. Dilution of the anhydrous extract with just sufficient hydrogen chloride dissolved in 2-propanol to induce acidity causes precipitation of the desired 4-(α-ethylbenzylamino)-3-methyl-2-phenylmorpholine hydrochloride. The product, filtered off and recrystallized from a mixture of ethanol and ether, melts at approximately 221.5–222°. It has the formula

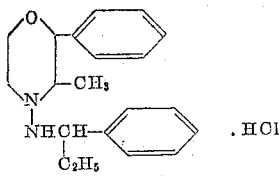

*Example 21*

3 - methyl-2-phenyl-4-(2-phenylethylamino)-morpholine hydrochloride.—A solution of 20 parts of 4-amino-3-methyl-2-phenylmorpholine and 12 parts of phenylacetaldehyde in 300 parts of methanol is agitated under 50 p.s.i. of hydrogen catalyzed by 1 part of platinum oxide until hydrogen uptake indicates that saturation of the imino linkage formed in process has been achieved (representatively, after 12½ hours). Catalyst is then removed by filtration and solvent by distillation, leaving 3-methyl-2-phenyl-4-(2-phenylethylamino)morpholine as a light green oil. Conversion to the acid addition salt proceeds by dissolution in a minimum quantity of absolute ethanol and subsequent addition of a 2-propanol solution of hydrogen chloride just sufficient to produce acidity.

The salt is precipitated by addition of anhydrous ether. Recovered by filtration and further purified by recrystallization from a mixture of absolute ethanol and anhydrous ether, the product is obtained as a colorless solid melting at approximately 187–188° (with decomposition). It has the formula

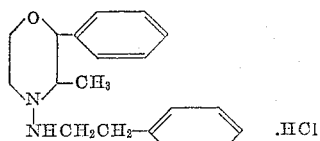

*Example 22*

3 - methyl-4-(1-methyl-2-phenylethylamino)-2-phenylmorpholine hydrochloride.—A mixture of 42 parts of 4-amino-3-methyl-2-phenylmorpholine and approximately 34 parts of 1-phenyl-2-propanone is maintained with agitation until the exothermic reaction which ensues has subsided. The resultant viscous mass is thoroughly mixed with 12 parts of glacial acetic acid, and the mixture thus obtained is dissolved in 105 parts of absolute ethanol. The ethanol solution is agitated under 1800 p.s.i. of hydrogen catalyzed by 1 part of platinum oxide until hydrogen uptake indicates that saturation of the imino linkage is complete, whereupon catalyst is removed by filtration and solvent by distillation at reduced pressures. The residue is suspended in 200 parts of water and the aqueous suspension made alkaline by addition of aqueous sodium hydroxide. The suspension is then extracted with ether and the ether extract dried over anhydrous potassium carbonate. Dilution of the anhydrous extract with just sufficient hydrogen chloride dissolved in 2-propanol to induce acidity causes precipitation of 3 - methyl-4-(1-methyl-2-phenylethylamino)-2-phenylmorpholine hydrochloride which, recrystallized from 2-propanone, melts at approximately 209–210°. The product has the formula

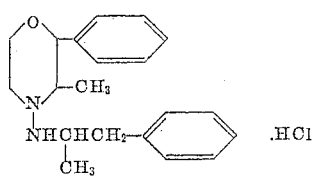

Concentration of the mother liquor from the 2-propanol recrystallization and repeated recrystallization of the solids which result therefrom, using a mixture of absolute ethanol and ether as the recrystallization solvent, affords a colorless product melting at 183–189°. This material is a mixture of enantiomorphs individually diastereomeric with those which compose the product melting at 209–210°.

*Example 23*

(A) Dextro-α-[N-(2-hydroxyethyl)-1-aminoethyl]-benzyl alcohol.—A solution of approximately 38 parts of dextro-norephedrine and 11 parts of ethylene oxide in 200 parts of absolute ethanol is heated at 70° in a sealed vessel for 24 hours. Distillation of solvent leaves as the residue dextro-α-[N(2 - hydroxyethyl)-1-aminoethyl]benzyl alcohol.

(B) Levo-3-methyl-2-phenylmorpholine.—A solution of 24 parts of the dextro-α-[N-(2-hydroxyethyl)-1-aminoethyl]benzyl alcohol of the foregoing part A of this example in 150 parts of aqueous 48% hydrogen bromide is heated at the boiling point under reflux for 3 hours. Hydrobromic acid is then removed by vacuum distillation, and the residue is taken up in 50 parts of water. The aqueous solution is made alkaline with aqueous sodium hydroxide, and the resultant mixture is extracted with ether. The ether extract, dried over anhydrous potassium carbonate and thereupon stripped of solvent by distillation, affords a residue which is distilled in vacuo. The fraction boiling at 83–85°/0.6 mm. is levo-3-methyl-2-phenylmorpholine, the specific rotation of which, referred to sodium D, is —18.7° in methanol solution.

(C) Levo - 3 - methyl-4-nitroso-2-phenylmorpholine.—Substitution of 35 parts of the levo-3-methyl-2-phenylmorpholine of the foregoing part B of this example for the (racemic) 3-methyl-2-phenylmorpholine called for in Example 2A affords, by the procedure there detailed, levo-3-methyl-4-nitroso-2-phenylmorpholine.

(D) Levo - 4 - amino-3-methyl-2-phenylmorpholine.—Substitution of 71 parts of the levo-3-methyl-4-nitroso-2-phenylmorpholine of the foregoing part C of this example for the (racemic) 3-methyl-4-nitroso-2-phenylmorpholine called for in Example 2B affords, by the procedure there detailed, levo-4-amino-3-methyl-2-phenylmorpholine characterized by a specific rotation, referred to sodium D, of —42.3° in methanol solution.

(E) Levo - 3 - methyl - 4 - (1-methyl-2-phenylethylamino)-2-phenylmorpholine hydrochloride.—Substitution of 20 parts of levo-4-amino-3-methyl-2-phenylmorpholine obtained as described in the foregoing part D of this example and 14 parts of 1-phenyl-2-propanone for the (racemic) 4-amino-3-methyl-2-phenylmorpholine and phenylacetaldehyde, respectively, called for in Example 21 affords, by the procedure there detailed, colorless levo-3-methyl-4-(1-methyl-2-phenylethylamino) - 2 - phenylmorpholine hydrochloride melting at approximately 226.5–227.5° and further characterized by a specific rotation, referred to sodium D, of —24.3° in methanol solution.

*Example 24*

(A) Dextro - 3 - methyl - 4 - nitroso-2-phenylmorpholine.—Substitution of 35 parts of dextro - 3 - methyl-2-phenylmorpholine having a specific rotation of +19.8° in methanol, referred to sodium D, for the (racemic) 3-methyl-2-phenylmorpholine called for in Example 2A affords, by the procedure there detailed, dextro-3-methyl-4-nitroso-2-phenylmorpholine.

(B) Dextro - 4 - amino-3-methyl-2-phenylmorpholine.—Substitution of 71 parts of dextro-3-methyl-4-nitroso-2-phenylmorpholine obtained as described in part A of this example for the (racemic) 3-methyl-4-nitroso-2-phenylmorpholine called for in Example 2B affords, by the procedure there detailed, dextro-4-amino-3-methyl-2-phenylmorpholine characterized by a specific rotation, referred to sodium D, of +36.1° in methanol solution.

(C) *Dextro - 3 - methyl - 4 - (1-methyl-2-phenylethylamino)-2-phenylmorpholine hydrochloride.*—Substitution of 20 parts of dextro-4-amino-3-methyl-2-phenylmorpholine obtained as described in part B of this example and 14 parts of 1-phenyl-2-propanone for the (racemic) 4-amino-3-methyl-2-phenylmorpholine and phenylacetaldehyde, respectively, called for in Example 21 affords, by the procedure there detailed, dextro-3-methyl-4-(1-methyl-2-phenylethylamino)-2-phenylmorpholine hydrochloride melting at 225–226.5° and further characterized by a specific rotation, referred to sodium D, of +23.6° in methanol solution.

*Example 25*

*Levo - 4 - (2-hydroxy - 1 - methyl-2-phenylethylamino)-3-methyl - 2 - phenylmorpholine hydrochloride.*—Substitution of 15 parts of levo-1-hydroxy-1-phenyl-2-propanone for the phenylacetaldehyde called for in Example 21 affords, by the procedure there detailed, levo-4-(2-hydroxy-1-methyl - 2 - phenylethylamino) - 3 - methyl-2-phenylmorpholine hydrochloride as colorless crystals melting at 158.5–160° (with decomposition). The product is further characterized by a specific rotation, referred to sodium D, of —39.4° in methanol solution. It has the formula

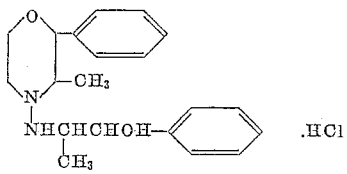

*Example 26*

*2-(p-methoxyphenyl) - 3 - methyl - 4 - (1-methyl-2-phenylethylamino)morpholine hydrochloride.*—Substitution of 6 parts of 4-amino-2-(p-methoxyphenyl)-3-methylmorpholine and 4 parts of 1-phenyl-2-propanone for the 4-amino - 3 - methyl-2-phenylmorpholine and 1-cyclopentyl-2-propanone, respectively, called for in Example 12 affords, by the procedure there detailed, 2-(p-methoxyphenyl)-3-methyl-4-(1-methyl - 2 - phenylethylamino)-morpholine hydrochloride melting at 215–216.5° and having the formula

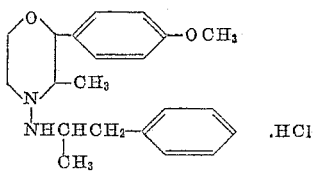

*Example 27*

*3-methyl - 4 - [1-methyl - 2 - (m-methoxyphenyl)ethylamino]-2-phenylmorpholine.*—To a mixture of 4 parts of 4-amino - 3 - methyl-2-phenylmorpholine and 4 parts of 1-(m-methoxyphenyl)-2-propanone is added, with agitation, approximately 1 part of glacial acetic acid. The resultant mixture is dissolved in 40 parts of absolute ethanol and the ethanol solution agitated under 1800 p.s.i. of hydrogen catalyzed by 1 part of platinum oxide until hydrogen uptake indicates that saturation of the imino linkage is complete. Catalyst is then removed by filtration and solvent by distillation at reduced pressures. The residue is suspended in water and the aqueous suspension made alkaline with sodium hydroxide. The suspension is thereupon extracted with ether, and the ether extract is dried over anhydrous potassium carbonate and then freed of solvent by distillation. The residue is 3- methyl - 4 - [1-methyl - 2 - (m-methoxyphenyl)ethylamino]-2-phenylmorpholine of the formula

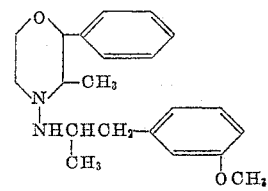

*Example 28*

*3-methyl - 4 - [1-methyl - 2 - (p-methoxyphenyl)ethylamino]-2-phenylmorpholine.*—Substitution of 4 parts of 1-(p-methoxyphenyl) - 2 - propanone for the 1-(m-methoxyphenyl)-2-propanone called for in Example 27 affords, by the precodure there detailed, 3-methyl-4-[1-methyl - 2 - (p-methoxyphenyl)ethylamino]-2-phenylmorpholine of the formula

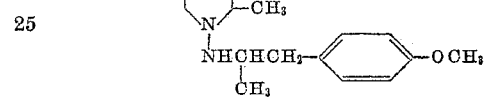

*Example 29*

*3 - methyl - 4-[1-methyl-2-(3,4-dimethoxyphenyl)ethylamino]-2-phenylmorpholine hydrochloride.*—Substitution of approximately 11 parts of 1-(3,4-dimethoxyphenyl)-2-propanone for the 1-cyclopentyl-2-propanone called for in Example 12 and increasing the quantity of absolute ethanol employed to 100 parts affords, by the procedure detailed in said example, 3-methyl-4-[1-methyl-2-(3,4-dimethoxyphenyl)ethylamino] - 2 - phenylmorpholine hydrochloride. The product is obtained as a white powder melting at approximately 216.5–217.5°. It has the formula

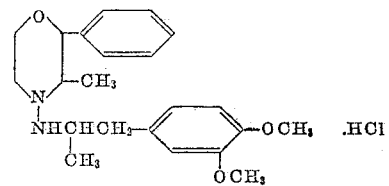

*Example 30*

*3 - methyl - 4-[1-methyl-2-(3,5-dimethoxyphenyl)ethylamino]-2-phenylmorpholine.*—Substitution of 5 parts of 1-(3,5-dimethoxyphenyl)-2-propanone for the 1-(m-methoxyphenyl)-2-propanone called for in Example 27 affords, by the procedure there detailed, 3-methyl-4-[1-methyl-2-(3,5-dimethoxyphenyl)ethylamino] - 2 - phenyl-morpholine, of the formula

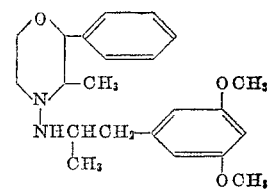

*Example 31*

*3 - methyl-4-(1-methyl-3-phenylpropylamino)-2-phenylmorpholine hydrochloride.*—Substitution of 8 parts of 1-benzyl-2-propanone for the propiophenone called for in Example 20 affords, by the procedure there detailed, 3-methyl - 4-(1-methyl-2-phenylpropylamino)-2-phenylmorpholine hydrochloride melting at 233–236°. The colorless product has the formula

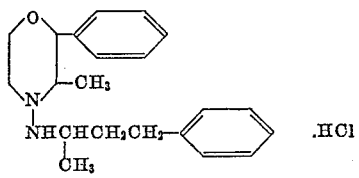

*Example 32*

*4 - (3 - hydroxy - 1 - methyl-3-phenylpropylamino)-3-methyl-2-phenylmorpholine.*—Substitution of 16 parts of 4-hydroxy-4-phenyl-2-butanone and 300 parts of methanol for the acetone and absolute ethanol, respectively, called for in Example 7A affords, by the procedure there detailed, 4-(3-hydroxy-1-methyl-3-phenylpropyl-amino)-3-methyl-2-phenylmorpholine, of the formula

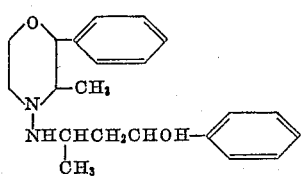

*Example 33*

*3-methyl-4-(α-methylfurfurylamino)-2-phenyl-morpholine hydrochloride.*—Substitution of 6 parts of furyl methyl ketone for the 1-cyclopentyl-2-propanone called for in Example 12, and increasing the amount of glacial acetic acid employed to 6 parts, affords, by the procedure detailed in said example, 3-methyl-4-(α-methylfurfuryl-amino)-2-phenylmorpholine hydrochloride as an off-white solid melting at approximately 180–181°. The product has the formula

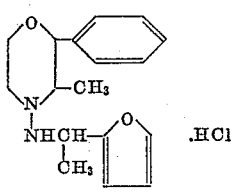

*Example 34*

*3 - methyl-4-[1 - methyl-2-(2-pyrazinyl)ethylamino]-2-phenylmorpholine.*—Substitution of 8 parts of 1-(2-pyrazinyl)-2-propanone for the cyclopentanone called for in Example 8A affords, by the procedure there detailed, 3-methyl - 4-[1-methyl-2-(2-pyrazinyl)ethylamino]-2-phenylmorpholine. The product, distilled in vacuo, boils at 188–196°/0.8 mm. It has the formula

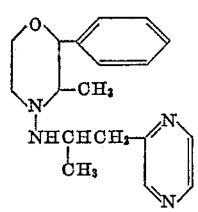

EXAMPLE 35

*3-methyl-4-[1-methyl-2-(3-indoyl)ethylamino]-2-phenylmorpholine hydrochloride.*—Substitution of 17 parts of 1-(3-indolyl)-2-propanone and 1600 parts of absolute ethanol for the 1-phenyl-2-propanone and methanol, respectively, called for in Example 21 affords, by the procedure there detailed, 3-methyl-4-[1-methyl-2-(3-indolyl)-ethylamino]-2-phenylmorpholine hydrochloride as a pale yellow powder melting at 207–209°. The product has the formula

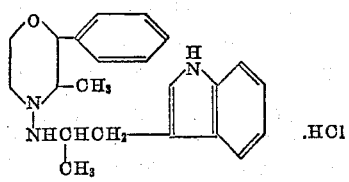

EXAMPLE 36

(A) *4-nitroso-2,3-diphenylmorpholine.*—To a solution of 61 parts of 2,3-diphenylmorpholine in 25 parts of concentrated hydrochloric acid diluted with 80 parts of water is slowly added, with agitation at 75°, a solution of 18 parts of sodium nitrite in 48 parts of water. When the addition is complete, agitation at 75° is maintained for 2 hours, whereupon the reaction mixture is chilled and filtered. The product isolated by this means is 4-nitroso-2,3-diphenylmorpholine.

(B) *4-amino-2,3-diphenylmorpholine.*—Substitution of approximately 9 parts of 4-nitroso-2,3-diphenylmorpholine for the 4-formylamino-3-methyl-2-phenylmorpholine called for in Example 5B affords, by the procedure there detailed, 4-amino-2,3-diphenylmorpholine as an orange oil.

(C) *4-amino-2,3-diphenylmorpholine hydrochloride.*—Conversion of the base of the foregoing part B of this example to the monohydrochloride salt in accordance with the technique detailed in Example 5C affords, 4-amino-2,3-diphenylmorpholine hydrochloride melting at 209–211°. The colorless product has the formula

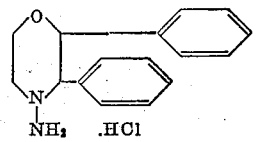

EXAMPLE 37

(A) *4-isopropylamino-2,3-diphenylmorpholine.*—Substitution of 20 parts of 4-amino-2,3-diphenylmorpholine and 240 parts of methanol for the 4-amino-3-methyl-2-phenylmorpholine and absolute ethanol, respectively, called for in Example 7A affords, by the procedure there detailed, 4-isopropylamino-2,3-diphenylmorpholine.

(B) *4-isopropylamino-2,3-diphenylmorpholine hydrochloride monoethanolate.*—Conversion of the base of the foregoing part A of this example to the monohydrochloride salt in accordance with the technique of Example 5C affords 4-isopropylamino-2,3-diphenylmorpholine hydrochloride as the monoethanolate melting at 149–151°. The product has the formula

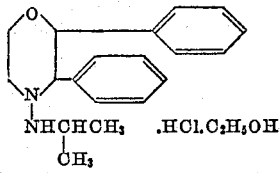

EXAMPLE 38

*4-(1-methyl-2-phenylethylamino)-2,3-diphenylmorpholine.*—Substitution of 20 parts of 4-amino-2,3-diphenylmorpholine, 11 parts of 1-phenyl-2-propanone, and 240 parts of methanol for the 4-amino-3-methyl-2-phenylmorpholine, acetone, and absolute ethanol, respectively, called for in Example 7A affords, by the procedure there detailed, 4-(1-methyl-2-phenylethylamino)-2,3-diphenylmorpholine, as a viscous light yellow oil. The product has the formula

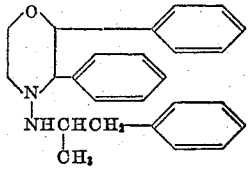

EXAMPLE 39

*Levo-4-(2-hydroxy-1-methyl-2-phenylethylamino) - 2,3-diphenylmorpholine.*—Substitution of 20 parts of 4-amino-2,3-diphenylmorpholine, 12 parts of levo-1-hydroxy-1-phenyl-2-propanone, and 300 parts of methanol for the 4-amino-3-methyl-2-phenylmorpholine, acetone, and absolute ethanol, respectively, called for in Example 7A affords, by the procedure there detailed levo-4-(2-hydroxy-1-methyl-2-phenylamino) - 2,3 - diphenylmorpholine, of the formula

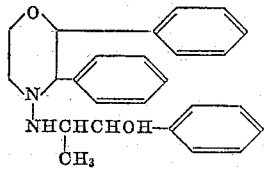

*Example 40*

(A) *2-cyclohexyl-3-methyl - 4 - nitrosomorpholine.*—Substitution of 37 parts of 2-cyclohexyl-3-methylmorpholine for the 3-methyl-2-phenylmorpholine called for in Example 2A affords, by the procedure there detailed, 2-cyclohexyl-3-methyl-4-nitrosomorpholine as a pale yellow solid melting in the range 51–55°.

(B) *4-amino-2 - cyclohexyl - 3 - methylmorpholine.*—Substitution of 73 parts of 2-cyclohexyl-3-methyl-4-nitrosomorpholine for the 3-methyl-4-nitroso-2-phenylmorpholine called for in Example 2B affords, by the procedure there detailed, 4-amino-2-cyclohexyl-3-methylmorpholine as a yellow oil.

(C) *4-amino-2-cyclohexyl-3-methylmorpholine hydrochloride.*—Conversion of the base of the foregoing part B of this example to the monohydrochloride salt in accordance with the technique of Example 5C affords colorless 4-amino-2-cyclohexyl-3-methylmorpholine hydrochloride melting at 212–214°. The product has the formula

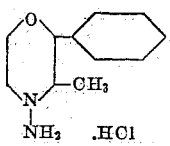

*Example 41*

(A) *2 - (p-methoxycyclohexyl)-3-methylmorpholine.*—A solution of 30 parts of 2-(p-methoxphenyl)-3-methylmorpholine in 800 parts of ethanol is hydrogenated under 900 p.s.i. at 75° in the presence of 3 parts of ruthenium oxide catalyst. Removal of the catalyst by filtration, followed by distillation of the solvent in vacuo, affords 2-(p-methoxycyclohexyl)-3-methylmorpholine as an orange oil.

(B) *2-(p-methoxycyclohexyl)-3-methylmorpholine hydrochloride.*—Conversion of the base of the foregoing part A of this example to the monohydrochloride salt in accordance with the technique of Example 5C affords 2-(p-methoxycyclohexyl)-3-methylmorpholine hydrochloride as a white crystalline solid melting at approximately 205–206°.

(C) *2-(p-methoxycyclohexyl) - 3-methyl-4-nitrosomorpholine.*—Substitution of 42 parts of 2-(p-methoxycyclohexyl)-3-methylmorpholine for the 3-methyl-2-phenylmorpholine called for in Example 2A affords, by the procedure there detailed, 2-(p-methoxycyclohexyl)-3-methyl-4-nitrosomorpholine.

(D) *4-amino-2-(p-methoxycyclohexyl) - 3-methylmorpholine.*—Substitution of approximately 84 parts of 2-(p-methoxycyclohexyl-3-methyl-4-nitrosomorpholine for the 2 - (p-methoxyphenyl)-3-methyl-4-nitrosomorpholine called for in Example 4B affords, by the procedure there detailed, 4-amino-2-(p-methoxycyclohexyl)-3-methylmorpholine as a yellow-orange oil.

(E) *4-amino-2-(p - methoxycyclohexyl)-3-methylmorpholine hydrochloride.*—Conversion of the base of the foregoing part D of this example to the corresponding monohydrochloride in accordance with the technique of Example 5C affords 4-amino-2-(p-methoxycyclohexyl)-3-methylmorpholine hydrochloride as an off-white solid melting at 206–208°. The product has the formula

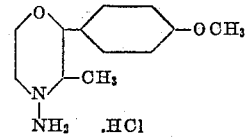

*Example 42*

(A) *2-cyclohexyl-4-isopropylamino-3 - methylmorpholine.*—Substitution of 20 parts of 4-amino-2-cyclohexyl-3-methylmorpholine and 95 parts of methanol for the 4-amino-3-methyl-2-phenylmorpholine and absolute ethanol, respectively, called for in Example 7A affords, by the procedure there detailed, 2-cyclohexyl-4-isopropylamino-3-methylmorpholine.

(B) *2-cyclohexyl-4-isopropylamino - 3-methylmorpholine hydrochloride.*—Conversion of the base of the foregoing part A of this example to the monohydrochloride salt in accordance with the technique of Example 5C affords 2-cyclohexyl-4-isopropylamino-3-methylmorpholine hydrochloride as a colorless solid melting at 166–169°. The product has the formula

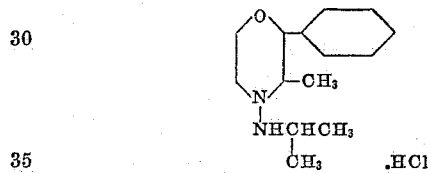

*Example 43*

*2-cyclohexyl-4-heptylamino-3-methylmorpholine.*—Substitution of 20 parts of 4-amino-2-cyclohexyl-3-methylmorpholine, 12 parts of heptaldehyde, and 140 parts of methanol for the 4-amino-3-methyl-2-phenylmorpholine, acetone, and absolute ethanol respectively, called for in Example 7A affords, by the procedure there detailed, 2-cyclohexyl-4-heptylamino-3-methylmorpholine, of the formula

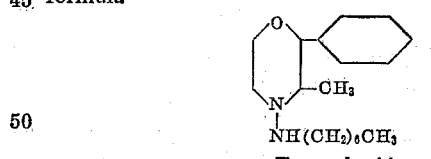

*Example 44*

*2-cyclohexyl-3-methyl-4-(1-methyl - 2 - cyclohexylethylamino)morpholine hydrochloride.*—Substitution of 10 parts of 4-amino-2-cyclohexyl-3-methylmorpholine and 8 parts of 1-cyclohexyl-2-propanone for the 4-amino-3-methyl-2-phenylmorpholine and 1-cyclopentyl-2-propanone, respectively, called for in Example 12 affords, by the procedure there detailed, 2-cyclohexyl-3-methyl-4-(1-methyl-2-cyclohexylethylamino)morpholine hydrochloride as a white powder melting at 227–229°. The product has the formula

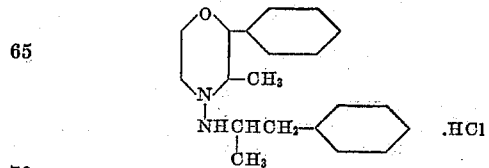

*Example 45*

*2-cyclohexyl-3-methyl - 4 - (o-phenylcyclohexylamino)-morpholine.*—Substitution of approximately 10 parts of 4-amino-2-cyclohexyl-3-methylmorpholine and approximately 11 parts of o-phenylcyclohexanone for the 4- amino-3-methyl-2-phenylmorpholine and cyclopentanone, respectively, called for in Example 8A affords, by the procedure there detailed, 2-cyclohexyl-3-methyl-4-(o-phenyl-cyclohexylamino)morpholine. Recrystallized from absolute ethanol, the product is obtained as white needles melting at 136.5–138.5°. It has the formula

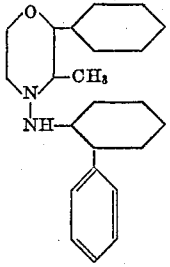

*Example 46*

2-cyclohexyl-4-(α-methylbenzylamino) - 3 - methylmorpholine hydrochloride.—Substitution of 10 parts of 4-amino-2-cyclohexyl-3-methylmorpholine and approximately 7 parts of acetophenone for the 4-amino-3-methyl-2-phenylmorpholine and 1-cyclopentyl-2-propanone, respectively, called for in Example 12 affords, by the procedure there detailed, 2-cyclohexyl-4-(α-methylbenzylamino)-3-methylmorpholine hydrochloride as a white powder melting at approximately 233.5–234°. The product has the formula

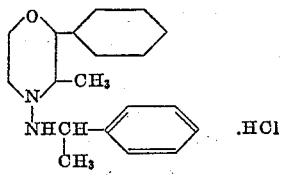

*Example 47*

2-cyclohexyl-4-(α-ethylbenzylamino) - 3 - methylmorpholine hydrochloride.—Substitution of 10 parts of 4-amino-2-cyclohexyl-3-methylmorpholine and 7 parts of propiophenone for the 4-amino-3-methyl-2-phenylmorpholine and 1-cyclopentyl-2-propanone, respectively, called for in Example 12 affords, by the procedure there detailed, 2-cyclohexyl-4-(α-ethylbenzylamino)-3-methylmorpholine hydrochloride as a white powder melting at 227–228.5°. The product has the formula

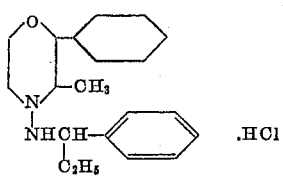

*Example 48*

2-cyclohexyl-3-methyl - 4 - (1-methyl-2-phenylethylamino)morpholine hydrochloride.—Substitution of 15 parts of 4-amino-2-cyclohexyl-3-methylmorpholine and approximately 11 parts of 1-phenyl-2-propanone for the 4-amino-3-methyl-2-phenylmorpholine and phenylacetaldehyde, respectively, called for in Example 21 affords, by the procedure there detailed, 2-cyclohexyl-3-methyl-4-(1-methyl-2-phenylethylamino)morpholine hydrochloride as a colorless solid melting at 213–214.5° (with decomposition). The product has the formula

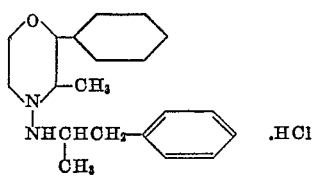

*Example 49*

Levo-2-cyclohexyl-4-(2-hydroxy - 1 - methyl-2-phenyl-ethylamino)-3-methylmorpholine hydrochloride.—Substitution of 20 parts of 4-amino-2-cyclohexyl-3-methylmorpholine and 15 parts of levo-1-hydroxy-1-phenyl-2-propanone for the 4-amino-3-methyl-2-phenylmorpholine and phenylacetaldehyde, respectively, called for in Example 21 affords, by the procedure there detailed, levo-2-cyclohexyl-4-(2-hydroxy-1-methyl - 2 - phenylethylamino)-3-methylmorpholine hydrochloride as a colorless material melting at 193–195° (with decomposition), and further characterized by a specific rotation of −27°, referred to sodium D, in methanol solution. The product has the formula

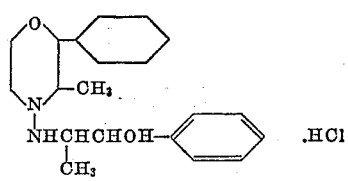

*Example 50*

2 - (p - methoxycyclohexyl) - 3 - methyl - 4 - (1-methyl-2 - phenylethylamino)morpholine hydrochloride.—Substitution of 6 parts of 4-amino-2-(p-methoxycyclohexyl)-3-methylmorpholine and 4 parts of 1-phenyl-2-propanone for the 4-amino-3-methyl-2-phenylmorpholine and 1-cyclopentyl-2-propanone, respectively, called for in Example 12 affords, by the procedure there detailed, 2-(p-methoxycyclohexyl) - 3 - methyl - 4 - (1 - methyl - 2-phenylethylamino)-morpholine hydrochloride, a colorless solid melting at 210–212°. The product has the formula

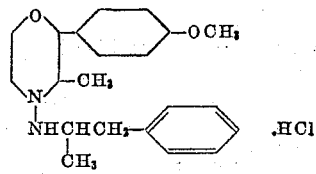

*Example 51*

2 - cyclohexyl - 3 - methyl - 4 - (1 - methyl - 3 - phenylpropylamino)morpholine hydrochloride.—Substitution of 20 parts of 4-amino-2-cyclohexyl-3-methylmorpholine and approximately 15 parts of 4-phenyl-3-buten-2-one for the 4-amino-3-methyl-2-phenylmorpholine and phenylacetaldehyde, respectively, called for in Example 21 affords, by the procedure there detailed, 2-cyclohexyl-3-methyl - 4 - (1 - methyl - 3 - phenylpropylamino)morpholine hydrochloride, a colorless solid melting at 182.5–184.5° (with decomposition). The product has the formula

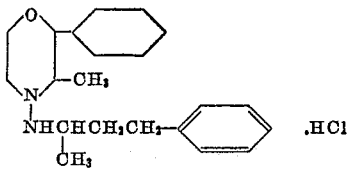

What is claimed is:
1. A compound of the formula

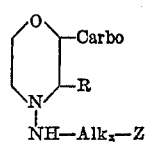

wherein (a) Carbo represents a member of the group consisting of radicals of the formulas

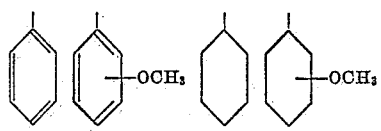

(b) R represents a member of the group consisting of hydrogen and radicals of the formulas

—CH₃

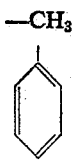

(c) Alk represents a member of the group consisting of radicals of the formulas

—C_mH_{2m}—

—C_{m-1}H_{2(m-1)}CHOH— in which *m* represents a positive integer less than 5

(d) Z represents a member of the group consisting of hydrogen and radicals of the formulas —C_nH_{2n+1}

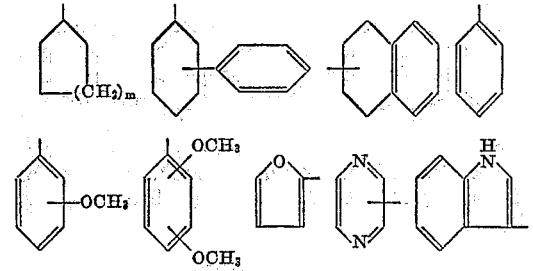

in which *n* represents a positive integer less than 8 and *m* is defined as before, and (e) *x* represents a member of the group consisting of 0 and 1 when Z represents a cyclic radical, otherwise *x* represents 0.

2. A compound of the formula

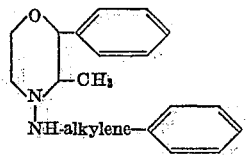

wherein the alkylene radical represented contains fewer than 5 carbon atoms.

3. 3-methyl-4-(1-methyl-2-phenylethylamino)-2-phenylmorpholine.
4. 4-amino-3-methyl-2-phenylmorpholine.
5. A compound of the formula

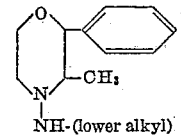

6. 4-isopropylamino-3-methyl-2-phenylmorpholine.
7. A compound of the formula

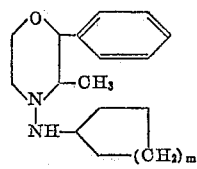

wherein *m* represents a positive integer less than 5.

8. 4-cyclopentylamino-3-methyl-2-phenylmorpholine.
9. A compound of the formula

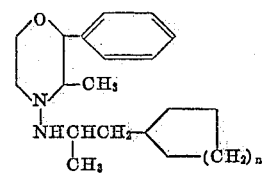

wherein *n* represents a positive integer less than 3.

10. 3-methyl-4-(1-methyl-2-cyclopentylethylamino)-2-phenylmorpholine.
11. 4-amino-2,3-diphenylmorpholine.
12. 4-amino-2-cyclohexyl-3-methylmorpholine.
13. A compound of the formula

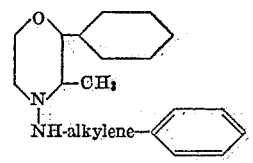

wherein the alkylene radical represented contains fewer than 5 carbon atoms.

14. 2-cyclohexyl-3-methyl-4-(1-methyl-2-phenylethylamino.
15. 3-methyl-4-dimethylamino-2-phenylmorpholine.
16. 2-cyclohexyl-3-methyl-4-nitrosomorpholine.
17. 3-methyl-4-nitroso-2-phenylmorpholine.

No references cited.